United States Patent [19]
Ahmed

[11] 4,126,815
[45] Nov. 21, 1978

[54] DELAYED KINESCOPE BLANKING PULSE GENERATOR
[75] Inventor: Adel A. A. Ahmed, Annandale, N.J.
[73] Assignee: RCA Corporation, New York, N.Y.
[21] Appl. No.: 829,562
[22] Filed: Aug. 31, 1977
[51] Int. Cl.² ............................................. H01J 29/52
[52] U.S. Cl. ................................................... 315/384
[58] Field of Search ........................ 315/384, 385, 386; 358/165

[56] References Cited
U.S. PATENT DOCUMENTS
3,931,545  1/1976  Marino .................................. 315/384

Primary Examiner—Theodore M. Blum
Attorney, Agent, or Firm—Eugene M. Whitacre; Paul J. Rasmussen; William H. Meise

[57] ABSTRACT

A delayed transition kinescope blanking pulse generator has a capacitor supplied with charging current from a first current source. A switched second current source controlled by the blanking cycle initiation pulse provides a discharging current greater than the charging current. The capacitor is initially uncharged. When the blanking cycle is initiated the second controlled current source is turned off and the capacitor charges. When the capacitor ramp voltage reaches a particular value after a charging delay a voltage-sensitive switch produces a kinescope blanking pulse. When the blanking cycle initiation pulse ends, the second current source turns on and discharges the capacitor. A current-sensitive switch responsive to the discharge current maintains the kinescope blanking pulse until the capacitor is discharged.

15 Claims, 4 Drawing Figures

DELAYED KINESCOPE BLANKING PULSE GENERATOR

BACKGROUND OF THE INVENTION

This invention relates to kinescope blanking pulse generators which produce blanking pulses which are delayed with respect to a synchronizing pulse initiating the retrace cycle and which are useful in television display arrangements.

A switched synchronous vertical deflection (SSVD) circuit is described in U.S. patent application Ser. No. 595,809, filed July 14, 1975 for Peter Eduard Haferl and entitled "SWITCHED VERTICAL DEFLECTION SYSTEM", in which energy is supplied to the vertical deflection winding on a kinescope by means of switched reactances coupled to the horizontal deflection generator. These switched reactances are controlled by a vertical sawtooth generator, the trace and retrace intervals of which are in turn controlled by the vertical synchronizing signals. A pulse-position modulator driven by the sawtooth generator and synchronized with the horizontal retrace pulses generates switch gating signals which control the switched reactances in a manner to generate a sawtooth deflection current at the vertical rate in the vertical deflection winding. This arrangement has low power consumption by comparison with other vertical deflection circuits and is considered commercially advantageous.

As is well known, it is very advantageous from the point of view of cost and reliability to include as many of the functions of a television receiver as is possible within integrated circuits. Since the low-power portions of a television receiver including a synchronous switched vertical deflection circuit according to the aforementioned U.S. patent application Ser. No. 595,809 are relatively complex, an advantage in cost and reliability, as well as in serviceability, may be obtained by forming the pulse position modulator on an integrated circuit together with other ancilliary circuits such as a blanking pulse generator. It has been discovered, however, that a switched synchronous vertical deflection system according to the aforementioned U.S. patent application Ser. No. 595,809 has an inherent delay between the generated vertical sawtooth and the resulting vertical deflection current which depends upon the design of the deflection winding, which in turn depends upon the kinescope size and type. The magnitude of this delay has been observed to be in the range between 30 and 150 microseconds, and in special cases almost zero. The variation of the delay from receiver to receiver within each type, however, remains relatively constant. Consequently, in order to make it possible for a single control circuit to be used for a large variety of television yoke designs or kinescope sizes, means must be provided for delaying the generation of the kinescope blanking pulse relative to the synchronizing pulse. The delay must be by an amount depending upon the delay of the vertical deflection circuit.

It is known from U.S. Pat. No. 3,931,545, issued on Jan. 6, 1976 to Francis C. Marino to allow the horizontal blanking interval to commence in coincidence with the horizontal synchronizing pulse but to delay the cutoff of the horizontal output transistor by a period of time equal to the entire horizontal sweep period less the transistor storage time by the use of multivibrators coupled in tandem. This, however, is vulnerable to display distortion due to sweep jitter, resulting from the regenerative nature of the multivibrators. Furthermore, the use of tandem coupled multivibrators requires the use of multiple timing capacitors not coupled to the same node, which requires additional interface pins between the external circuit and the monolithic integrated control circuit. Thus, it is desirable to control the delay of the synchronizing pulse with a single externally accessible delay control element.

SUMMARY OF THE INVENTION

A delayed kinescope blanking pulse generator includes capacitance means supplied with charging current of a first polarity to form a signal representing the integrated charging current. A controllable second current source is coupled to the capacitance means for producing a charging current having an opposite polarity and amplitude greater than that of the first charging current source. The control electrode of the controllable current source is coupled to the source of synchronizing signals. A voltage-sensitive switch is coupled to the capacitor and senses the integrated signal for generating at an output terminal a blanking signal pulse component having a first polarity when the integrated signal exceeds a predetermined value, and a current-sensitive switch is coupled to the controllable current source and to the output terminal and responsive to generation of the second charging current to produce a blanking signal pulse component having the same first polarity.

DESCRIPTION OF THE INVENTION

Figure 1:
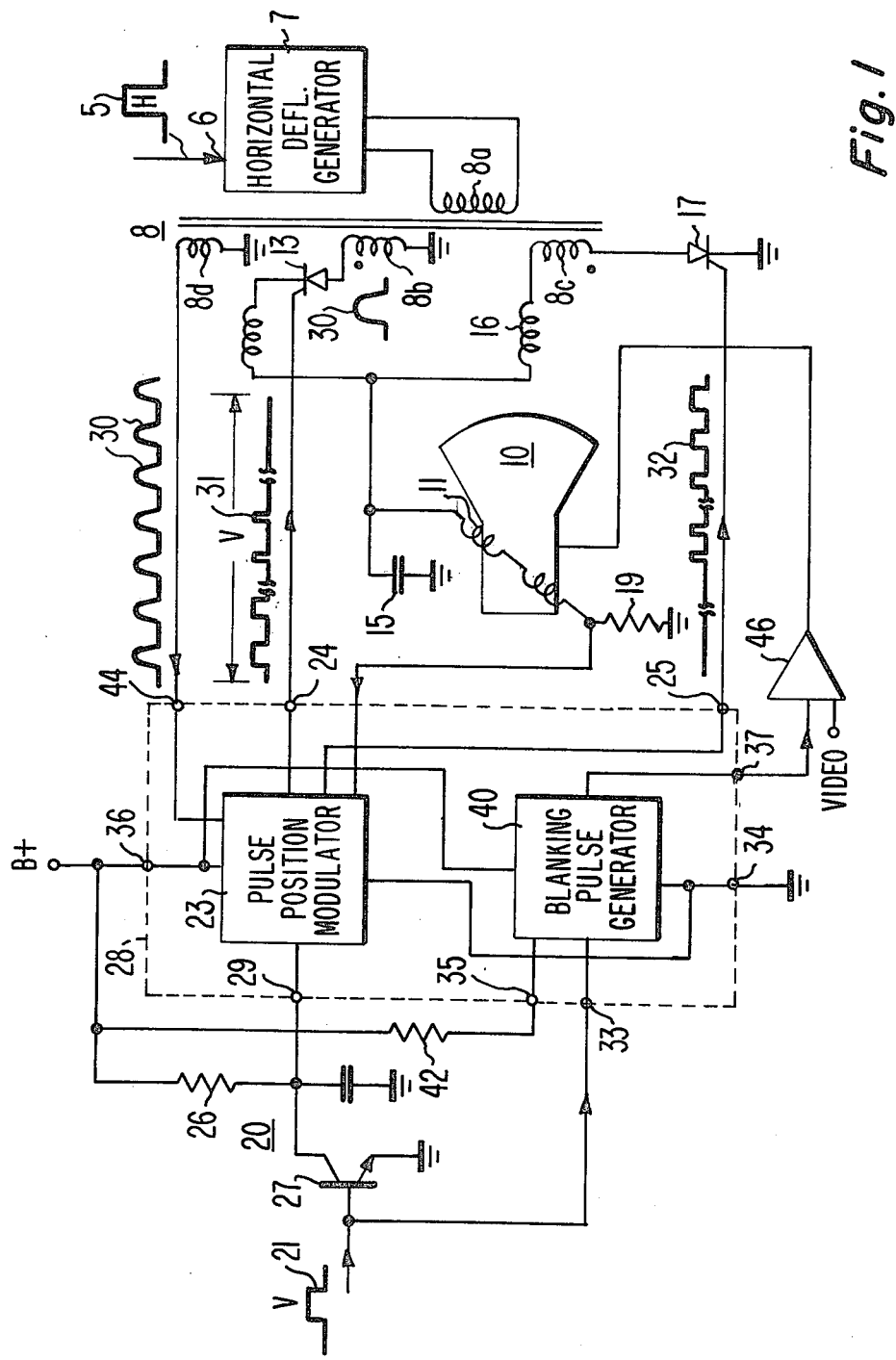
FIG. 1 illustrates a vertical deflection circuit according to the aforementioned U.S. patent application Ser. No. 595,809 and embodying the invention.

FIG. 1 shows, partially in block and partially in schematic form, the deflection and display portion of a television device. At the right of FIG. 1, a horizontal deflection generator 7 is synchronized by horizontal deflection pulses depicted as amplitude-time waveform 5 applied to an input terminal 6 from a synchronizing signal separator, not shown. Horizontal deflection generator 7 drives a horizontal deflection winding, not shown, associated with the kinescope 10. Horizontal deflection generator 7 also drives the primary 8a of a transformer 8. A secondary winding 8b of transformer 8, poled as shown, has one end connected to ground. The other end of secondary winding 8b couples recurrent positive-going horizontal retrace pulses depicted as pulse 30 to the anode of a thyristor or SCR 13, the cathode circuit of which includes the serial connection of an inductor 14 and an integrating capacitor 15 coupled to ground. The end of a secondary winding 8c of transformer 8 at which a positive-going retrace pulse appears is coupled to ground by the anode-cathode path of a thyristor 17. The other end of winding 8c is coupled to capacitor 15 by an inductor 16. Capacitor 15 is coupled in parallel with the series combination of a current sensing feedback resistor 19 and a vertical deflection winding 11 which is disposed about the neck of kinescope 10.

A vertical sawtooth generator 20 at the left of FIG. 1 includes a capacitor 22 and a charging resistor 26 coupled between B+ and ground. A discharge switch transistor 27 has its collector-emitter path coupled across capacitor 22. The base of transistor 27 is driven by vertical synchronizing pulses 21 from the sync separator. A recurrent sawtooth voltage having relatively short retrace intervals synchronized with the vertical synchronizing signals appears as is known across capacitor 22.

The vertical sawtooth signals appearing across capacitor 22 are coupled by way of an interface terminal 29 to a pulse position modulator 23 intrinsic to an integrated circuit 28. Pulse position modulator 23 is coupled by an integrated circuit interface terminal 36 to a source B+ of energizing potential and by way of a common interface terminal 34 to ground. Modulator 23 produces thyristor gating pulses shown as voltage waveforms 31 and 32 at interface terminals 24 and 25, respectively, for application to the gates of thyristors 13 and 17, respectively. A winding 8b of transformer 8 produces horizontal retrace voltage pulses shown as waveforms 30 in response to operation of the horizontal deflection generator. Winding 8b is coupled to integrated circuit 28 at an interface terminal 44 for synchronizing the gating pulses produced by modulator 23.

While the operation of the SSVD is described in detail in the aforementioned U.S. patent application Ser. No. 595,809, a short description of the operation follows. The gating pulses are initiated at times during the horizontal retrace interval which, in the case of top-of-scan thyristor gating pulses 31, are progressively delayed with respect to the horizontal retrace pulses, and, in the case of bottom-of-scan gating pulses 32, are initated at times which are progressively advanced with respect to the horizontal retrace pulses. In operation during the first part of the vertical deflection interval, gating pulses 31 enable top-of-scan thyristor 13 for conduction during the initial portions of the horizontal retrace interval. As a result, capacitor 15 charges in a resonant manner through inductor 14. The gating pulses cease before reversal of current in the resonant circuit including capacitor 15 and inductor 14, so that the resonant reversal of current in thyristor 13 turns it off unitl the next horizontal retrace interval again coincides with a gating pulse 31. As time progresses during the vertical deflection interval, gating pulses 31 occur later and later with respect to the horizontal retrace pulses, with the result that progressively less charging current flows in capacitor 15. Thus, progressively less voltage appears across vertical deflection winding 11 and the deflection current decreases.

Near the center of the vertical deflection interval, bottom-of-scan gating pulses 32 begin to occur at times near the end of the horizontal retrace pulses. Thus, bottom-of-scan thyristor 17 is enabled for conduction near the end of the horizontal retrace interval, charging capacitor 15 through inductor 16 in a resonant manner with a polarity opposite to that of the top-of-scan thyristor. The progressively advancing time of initiation of gating pulses 32 during the second half of the vertical deflection interval progressively increases the negative charging current in capacitor 15, which results in an increasing negative voltage across vertical deflection winding 11 so as to deflect the kinescope beam progressively towards the bottom of the raster.

In addition to other circuits, integrated circuit 28 contains a blanking pulse generator 40 which is triggered by vertical synchronizing pulses 21 applied at an interface terminal 33. Blanking pulse generator 40 is energized by B+ and is coupled to common interface terminal 34. Blanking pulse generator 40 produces blanking pulses at a rate and with a duration controlled by the rate and duration respectively of synchronizing pulses 21. The blanking pulses are coupled to an input of a video amplifier 46 by way of an interface terminal 37. The blanking pulses are combined in video amplifier 46 with the video to be displayed on the kinescope and both together are coupled to the kinescope from an output of amplifier 46.

As mentioned, the SSVD circuit has an inherent delay between the sawtooth voltage applied to interface terminal 29 and the resulting sawtooth current in deflection winding 11. Consequently, the blanking pulse generated by pulse 40 must be delayed relative to synchronizing pulse 21 in order to avoid blanking of video occurring at the bottom of the raster and unblanking during the latter portions of the retrace interval. Blanking pulse generator 40 delays generation of the kinescope blanking pulse applied to interface terminal 37 relative to synchronizing pulse 21 under the control of a resistor 42 coupled between interface terminal 35 and B+.

Figure 2:
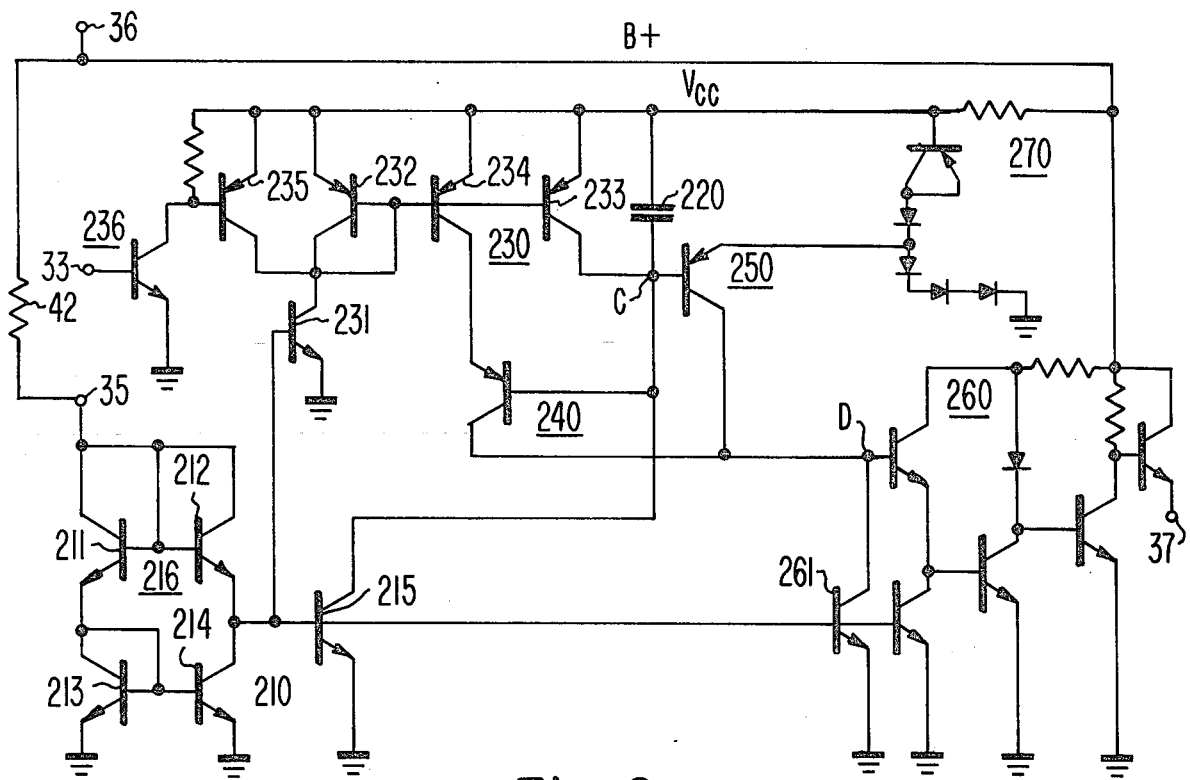
FIGS. 2 and 3 show embodiments of a blanking pulse generator suitable for use in conjunction with FIG. 1.

FIG. 2 shows in schematic form a blanking pulse generator which may be connected between interface terminals 33 through 37 of FIG. 1 as blanking pulse generator 40. Generally speaking, the arrangement of FIG. 2 includes a capacitor 220 at upper center. Capacitor 220 is provided a fixed charging current by a current source 210 at lower left. A controllable discharging current source 230 to the left of capacitor 220 provides a discharging current having a magnitude greater than the fixed charging current. A voltage sensitive switch 250 at right center senses the capacitor voltage and couples it to an output circuit 260 at the right. At the center of FIG. 2, a current-sensitive switch 240 is coupled to the discharging current source, to the capacitor and to the output circuit.

Current source 210 includes a biasing circuit designated generally as 216 and including a resistor 42 coupled between interface terminals 35 and 36 to provide a constant current to the remainder of the biasing network. Also included in biasing network 216 are diode-connected transistors 211 and 212 having their anodes coupled to terminal 35. The cathodes of diode-connected transistors 211 and 212 are coupled respectively to the anode of diode-connected transistor 213 and the collector of transistor 214. As is known from U.S. Pat. No. 3,868,581 issued on Feb. 25, 1975 in the name of Adel Ahmed, a bias voltage appears at the collector of transistor 214. Current source 210 also includes a transistor 215 having its base coupled to and receiving biasing current from the emitter of transistor 212. The collector of transistor 215 is coupled to one end of a capacitor 220 at a point C for providing a charging current thereto.

Capacitor 220 has its other end connected to a supply voltage Vcc provided from B+ by a shunt regulator designated generally as 270. Since Vcc is held constant, the charging current provided by transistor 215 tends to create a negative-going or decreasing ramp voltage across capacitor 220.

Controlled discharging current source 230 includes a transistor 231 having its base-emitter junction coupled in parallel with the base-emitter junction of transistor 215. Transistor 231 is dimensioned to provide twice the current of transistor 215. The collector of transistor 231 is coupled to the cathode of a diode-connected transistor 232 and the base of capacitor discharging transistor 233. Transistors 232 and 233 have their emitters coupled to Vcc. A transistor 234 has its base-emitter junction coupled in parallel with that of transistor 233, so transistor 234 tends to demand collector current when discharging transistor 233 conducts. A switch transistor 235 has its collector-to-emitter path coupled between the collector of transistor 231 and Vcc. Switch transistor 235 is driven by an inverting amplifier designated generally as 236, having its input coupled to interface terminal 33. With switch transistor 235 nonconductive, a current equal to the collector current of transistor 231 tends to flow in transistors 233 and 234. With switch 235 conductive, the collector current of transistor 231 is bypassed around diode 232 and transistors 233 and 234 become nonconductive.

The collector of transistor 234 is coupled to the emitter of a current-sensing transistor 240. The base of transistor 240 is coupled to point C. The collector of transistor 240 is coupled to a summing point D at the input of output stage 260. Switch 240 in conjunction with current source transistor 234 forms a controlled current source which responds to a combined turn-on signal consisting of a current input from source 230 and a voltage at the base input of transistor 240. A charge in either of these inputs can cause switch 240 to go OFF.

A voltage-sensing switch transistor 250 has its emitter coupled to a three-$V_{be}$ supply and its base coupled to capacitor 220 at point C. The collector of transistor 250 is coupled to summing point D.

Transistor 261 in output amplifier 260 has its base-emitter junction coupled in parallel with the base-emitter junction of transistor 215. Transistor 261 tends to reduce the voltage at summing point D towards ground. The remainder of output amplifier 260 is arranged as a noninverting amplifier of the voltage at summing point D and has interface terminal 37 as its output.

In operation near the end of a vertical deflection cycle, switch 235 is nonconductive and transistor 233 is conditioned for conduction. Capacitor 220 is fully discharged since the collector current demand of transistor 233 exceeds the current supply from transistor 215. While transistor 234 is conditioned for maximum conduction, the base-emitter junction of transistor 240 is not biased and transistor 240 is nonconductive. The base voltage of voltage-sensing transistor 250 exceeds its emitter voltage, and it is also nonconductive. The voltage at point D is drawn to the low saturation voltage of transistor 261.

Figure 4:
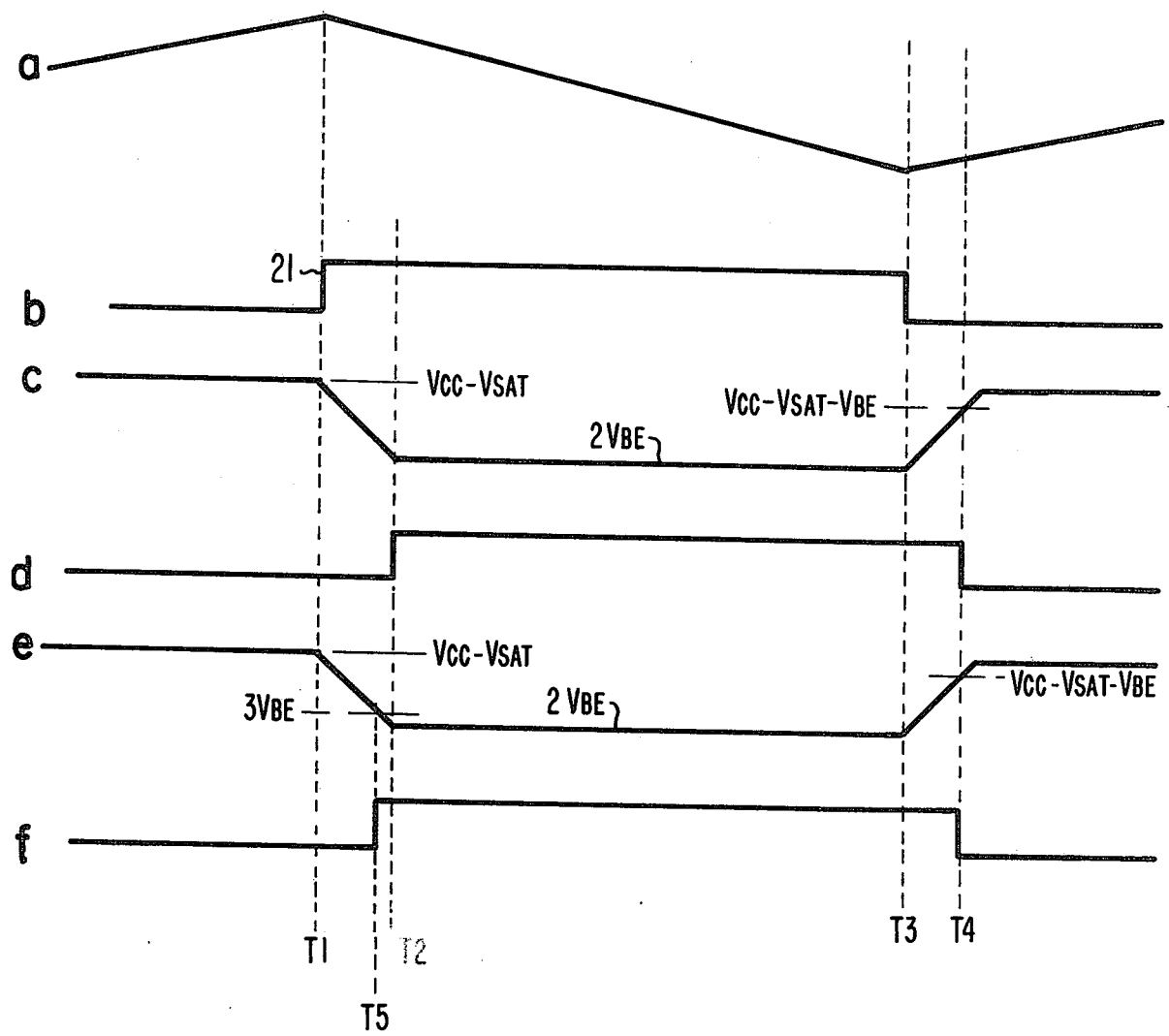
FIG. 4 illustrates voltage-time waveforms occurring in the arrangement of FIG. 1.

At time T1, synchronizing pulse 21 as shown in FIG. 1 and in FIG. 4b becomes positive, and causes discharge of capacitor 220 as shown in FIG. 4a.

Synchronizing pulse 21 also closes switch 235 of FIG. 2 at time T1, bypassing the collector current of transistor 231 away from transistors 233 and 234, which thereupon are not conditioned for conduction. A negative-going ramp voltage appears at point C as shown in FIG. 4c in the interval between times T1 and T2, as capacitor 220 charges from current source transistor 215. During this time, transistors 240 and 250 remain nonconductive and the voltage at point D and output terminal 37 remains low, as shown in FIG. 4d.

At some time such as T2 the negative-going ramp voltage at point C reaches 2 $V_{be}$, and transistor 250 conducts a current exceeding that of transistor 261. The voltage at point D and output terminal 37 rises as shown in FIG. 4d to form the leading edge of a kinescope blanking pulse. The negative-going ramp ceases as the voltage at point C is clamped to 2 $V_{be}$ by the base-emitter junction of transistor 250.

So long as synchronizing pulse 21 is positive, transistors 233 and 234 remain nonconductive. Synchronizing pulse 21 continues to be positive after the negative-going ramp at point C has reached 2 $V_{be}$. The positive value of pulse 21 maintains the ramp at the 2 $V_{be}$ level by preventing conduction of discharge transistor 233. This condition will continue until some time such as T3, at which time a synchronizing pulse goes negative.

When synchronizing pulse 21 becomes negative, switch transistor 235 ceases conduction and transistors 233 and 234 are conditioned to conduct a current equal to the collector current of transistor 231. Conduction of transistor 233 begins to discharge capacitor 220 and the voltage at point C begins to rise. Transistor 234 also conducts and its collector current flows through transistor 240 to point B, maintaining point D at a high potential. As the voltage at point C begins to ramp positive as shown in FIG. 4c in the interval between times T3 and T4, transistor 250 turns off. However, conduction by transistor 240 maintains point D positive, so the blanking pulse output at point D and terminal 37 remains positive, as shown in FIG. 4d.

The voltage at point C continues to ramp positive until some time such as T4 at which the voltage at point C no longer forward-biases transistor 240, whereupon it ceases conduction and the blanking pulse voltage at point D again becomes negative in preparation for another cycle. Capacitor 220 continues to discharge to the saturation voltage of transistor 233.

By reference to FIGS. 4b and 4d, it can easily be seen that the blanking pulse of FIG. 4d has the same duration as synchronizing pulse 21 but is delayed by the ramp voltage. The ramp time can be set equal to the vertical deflection amplifier delay for correct blanking of the kinescope retrace.

In the arrangement of FIG. 2, the ramp voltage occurring at point C starts from a voltage lower than Vcc by the saturation voltage of transistor 233, and ramps to a voltage 2 $V_{be}$ at time T2 as illustrated in FIG. 4c. In the other direction, the ramp begins at 2 $V_{be}$ at time T3. However, the delayed blanking pulse appearing at point D ends at time T4 when the ramp voltage is at Vcc minus the $V_{be}$ of transistor 234 and the saturation voltage of transistor 240.

Thus, the charging mode occurring between times T1 and T2 will have a different time than the discharging mode occurring between T3 and T4. The ratio of these two is given by $$(Vcc-2Vbe-Vsat-Vbe/Vcc-2Vbe)$$

This ratio represents a shortening of the blanking pulse. In a practical circuit, the ratio will be close to unity and will be negligible by comparison to the total blanking pulse duration. For example, if the ratio is 0.9 and delay is 150 microseconds, a reduction of the blanking pulse duration of 15 microseconds occurs. However, the total duration of the blanking pulse is some 900 microseconds, and the reduction is proportionally about 1.7%, which is negligibly small.

Since the supply voltage of the arrangement of FIG. 2 is regulated, the time reduction ratio will remain constant. It can therefore be corrected by a small adjustment in the geometry ratio of the transistors. For example, transistor 231 could be dimensioned to produce 1.9 times the current in transistor 215 rather than twice the current.

Figure 3:
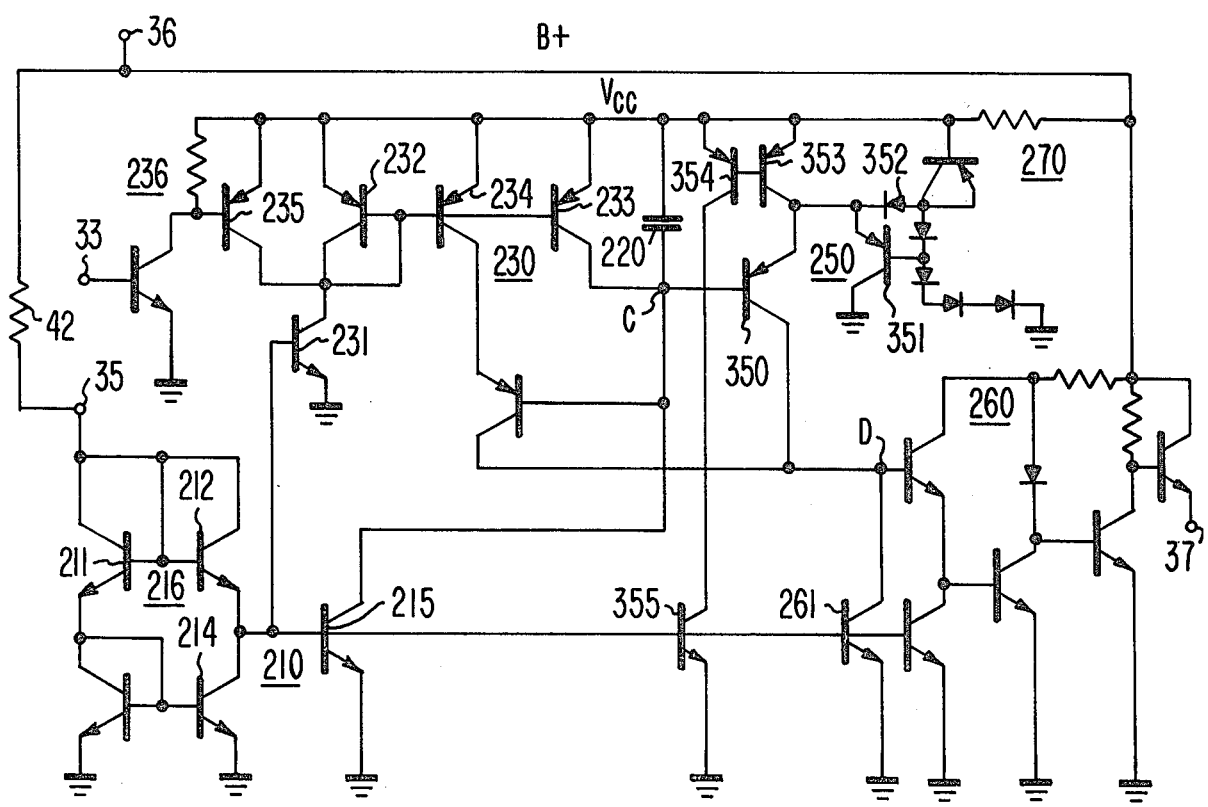

FIG. 3 shows an embodiment of a blanking pulse generator suitable for connection between interface terminals 33 and 37 of FIG. 1 in which the slope durations are equalized in a different manner. The arrangement of FIG. 3 differs from the arrangement of FIG. 2 only in the connections to the emitter of voltage sensing switch 250. Elements of FIG. 3 corresponding to elements of FIG. 2 are designated with the same number.

In FIG. 3, voltage sensing switch 250 includes a transistor 350 having base and emitter connections similar to those of transistor 250 of FIG. 2. The emitter of transistor 350 is connected to the 4 V$be$ point of voltage regulator 270 by a diode 352. The emitter of transistor 350 is also coupled to the emitter of a transistor 351, the collector of which is coupled to ground. The base of transistor 351 is coupled to the 3 V$be$ point of voltage regulator 270. The emitters of transistors 350 and 351 are supplied with operating current by a current mirror consisting of transistors 353 and 354 driven by a current source transistor 355.

In operation, when the voltage at point C is high, the base-emitter junction of transistor 350 is reversed biased. The current supplied by mirror transistor 353 raises the emitter voltage of transistor 351 to 4 V$be$, thereby conditioning transistor 351 to accept the current. Diode 352 is not biased and does not conduct.

As the negative-going ramp signal reaches 3 V$be$ at a time T5 as illustrated in FIG. 4e, transistor 350 becomes forward biased and raises the voltage at point D to begin the blanking interval by raising the voltage at point D as shown in FIG. 4f. At this time, transistor 351 becomes nonconductive as transistor 350 accepts the current from mirror transistor 353.

The voltage at point C continues to ramp negative and the voltage at the emitter of transistor 350 also goes negative, offset by 1 V$be$ from the ramp voltage. When the voltage at point C reaches 2 V$be$, diode 352 becomes conductive and clamps the voltage at point C.

In the arrangement of FIG. 3, the sensing portions of the cycles are equalized and the blanking pulse is delayed without a change in duration.

It will be apparent to those skilled in the art that other embodiments of the invention can be used, and that the invention can be used with other vertical deflection systems having delays.

The invention is especially well adapted for use in integrated circuits by virtue of delay control by a single resistor, such as resistor 42 which may be external to the integrated circuit, and by, the independence of the delay and the pulse width, and the very wide range of delays available, thereby permitting use of the same integrated circuit type with systems having differing delays. Also, the charging capacitor can be made on the order of 5 picofarads in the context of the described vertical amplifier delays, which is a value capable of being integrated.

What is claimed is:

1. A delayed transition blanking pulse generator for a television kinescope deflection apparatus synchronized from a source of synchronizing signals initiating but preceding a blanking pulse transition, comprising:
    first current source means of a first polarity;
    capacitance means coupled to said first current source means for accepting first charging current therefrom to form an integrated signal;
    controllable second current source means coupled to said capacitance means for producing a second charging current therein of an opposite polarity and greater amplitude than that of said first current source;
    first coupling means for coupling a control electrode of said controllable second current source to the source of synchronizing signals;
    voltage-sensitive switch means coupled to said capacitance means for generating a blanking signal pulse component of a first polarity at an output terminal when said integrated signal exceeds a predetermined value; and
    current-sensitive switch means coupled to said second current source and to said output terminal and responsive to generation of said second charging current to produce a blanking signal pulse component of said first polarity.

2. A delayed transistor blanking pulse generator according to claim 1 wherein said current-sensitive switch means is coupled to said capacitance means and inhibited by particular values of said integrated signal.

3. A delayed transistor blanking pulse generator according to claim 1 wherein said first current source comprises resistance means coupled in series with constant-voltage biasing means and the series combination of said resistance means and said biasing means is coupled across a source of constant operating potential.

4. A delayed transistor blanking pulse generator according to claim 3 wherein said blanking pulse generator is substantially comprised within an integrated circuit and said resistance means is extrinsic to said integrated circuit.

5. A delayed transistor delayed blanking generator according to claim 3 wherein said biasing means comprises forward-biased diode means and further comprises output transistor means biased by said forward-biased diode means and having a collector coupled to the output of said first current source means for producing a current of said first polarity.

6. A delayed transistor blanking pulse generator according to claim 5 wherein said capacitance means has a first electrode coupled to a source of reference potential and a second electrode coupled to said collector of said output transistor means at a point for forming a ramp voltage.

7. A delayed transistor blanking pulse generator according to claim 1 wherein said controllable second current source comprises second current source means;
    current mirror means coupled to an output of said second current source means for producing said second charging current; and
    switch means coupled to said second current source means and having a control electrode forming said control electrode of said controllable second current source means.

8. A delayed transistor blanking pulse generator according to claim 1 wherein said current-sensitive switch means comprises a current-sensitive transistor having an emitter coupled to an output terminal of said controllable second current source means, a base coupled to said capacitance means and a collector coupled to said output terminal of said blanking pulse generator.

9. A delayed transistor blanking pulse generator according to claim 1 wherein said voltage-sensitive switch means comprises a voltage-sensitive switch transistor having a base electrode coupled to said capacitance means at a point and having a collector electrode coupled to the output terminal of said blanking pulse generator.

10. A delayed transistor blanking pulse generator according to claim 9 wherein said collector electrode of said voltage-sensitive switch transistor is coupled to a point of reference potential by collector load means.

11. A delayed transistor blanking pulse generator according to claim 9 wherein the emitter collector of said voltage-sensitive switch transistor is coupled to a point of reference potential.

12. A delayed transistor blanking pulse generator according to claim 9 wherein said voltage-sensitive switch means further comprises a second transistor emitter-coupled to said voltage-sensitive switch transistor and having its base electrode coupled to a source of reference potential; a current source coupled to the joined emitters of said second and voltage-sensitive switch transistors for supplying operating current thereto; and unidirectional current conducting means coupled from a source of reference potential to said joined emitters.

13. A delayed transistor blanking pulse generator according to claim 9 wherein said collector load means comprises constant-current source means.

14. A delayed transistor blanking pulse generator in accordance with claim 13 wherein said collector load means comprises a constant-current source.

15. A delayed blanking pulse generator comprising:
resistance means coupled to a source of operating potential;
biasing means coupled in series with said resistance means;
a first transistor having a base-emitter junction coupled across said biasing means thereby forming at its collector electrode a first current source;
capacitance means coupled to said collector electrode of said first transistor at a first point for being charged therefrom, and forming a ramp voltage;
second transistor means having a base electrode coupled to said point, a collector electrode coupled to an output terminal of the blanking pulse generator for initiating a blanking pulse when said ramp voltage reaches a first value;
third transistor means having a controlled conduction path coupled in parallel with said capacitor for discharge thereof and having a control electrode;
fourth transistor means having a base-emitter junction coupled in parallel with said base-emitter junction of said first transistor for producing a constant collector current;
second biasing means coupled to said collector of said fourth transistor means and to said control electrode of said third transistor means for conditioning said third transistor means for conduction;
controllable switch means coupled in parallel with said second biasing means and having a control electrode coupled to a source of undelayed blanking pulses for periodically inhibiting conduction of said third transistor means;
fifth transistor means having a base-emitter junction coupled in parallel with said base-emitter junction of said third transistor means for being conditioned for conduction therewith;
sixth transistor means having an emitter electrode coupled to a collector electrode of said fifth transistor means, a base electrode coupled to said first point and a collector electrode coupled to said output terminal; and
seventh transistor means having a base-emitter junction coupled to said first biasing means for being conditioned for conduction and a collector electrode coupled to said output terminal.

* * * * *